United States Patent [19]

Nakamura et al.

[11] Patent Number: 5,228,092
[45] Date of Patent: Jul. 13, 1993

[54] VOICE TRANSDUCER

[75] Inventors: Yasuji Nakamura, Yokohama; Hisanori Kanasashi, Yamato, both of Japan

[73] Assignee: Matsushita Electric Industrial Co., Ltd., Osaka, Japan

[21] Appl. No.: 716,099

[22] Filed: Jun. 17, 1991

[30] Foreign Application Priority Data

Jun. 26, 1990 [JP] Japan .................. 2-167689

[51] Int. Cl.$^5$ .............................. H04R 25/00
[52] U.S. Cl. ................... 381/151; 381/68.3; 381/173
[58] Field of Search ......... 381/151, 173, 68.3, 381/114, 169; 297/68

[56] References Cited

U.S. PATENT DOCUMENTS

| | | | |
|---|---|---|---|
| 4,156,800 | 5/1979 | Sear et al. | 381/173 |
| 4,596,903 | 6/1986 | Yoshizawa | 381/151 |
| 4,696,045 | 9/1987 | Rosenthal | 381/114 |
| 4,793,652 | 12/1988 | Hannah et al. | 297/230 |
| 4,903,703 | 2/1990 | Igarashi et al. | 381/151 |
| 5,054,079 | 10/1991 | Frielingsdorf et al. | 381/151 |

FOREIGN PATENT DOCUMENTS

| | | |
|---|---|---|
| 0092822 | 11/1983 | European Pat. Off. . |
| 0288596 | 12/1986 | Japan .................. 381/187 |
| 336286 | 10/1930 | United Kingdom . |
| 971541 | 9/1964 | United Kingdom . |
| 8303733 | 10/1983 | World Int. Prop. O. . |

Primary Examiner—Jin F. Ng
Assistant Examiner—Huyen D. Le
Attorney, Agent, or Firm—Stevens, Davis, Miller & Mosher

[57] ABSTRACT

A voice transducer used for telecommunication by a telephone installed in a motor vehicle or the like, including: a main body having a side surface to be contacted with an operator's head so as to detect vibrations of produced voice waves when they are transmitted through the skull of the head, and convert them into electric signals; a holder member of the main body; and a connecting member which connects the main body to the holder member in such a manner that the position of the side surface of the main body with respect to the operator's head can be adjusted. The main body includes a piezoelectric transducer to detect the vibrations, a damper material which surrounds the piezoelectric transducer, and a casing which surrounds the damper material and includes the side surface to be contacted with the operator's head, and the side surface of the casing is pre-treated to have a small coefficient of friction. Such transducer solves the problems of output voltage drop and drastic deterioration of the S/N ratio which are induced by unfavorable contact between the voice transducer and the operator's head or by unnecessary vibrations which are generated by friction between the operator's hair and the voice transducer.

12 Claims, 4 Drawing Sheets

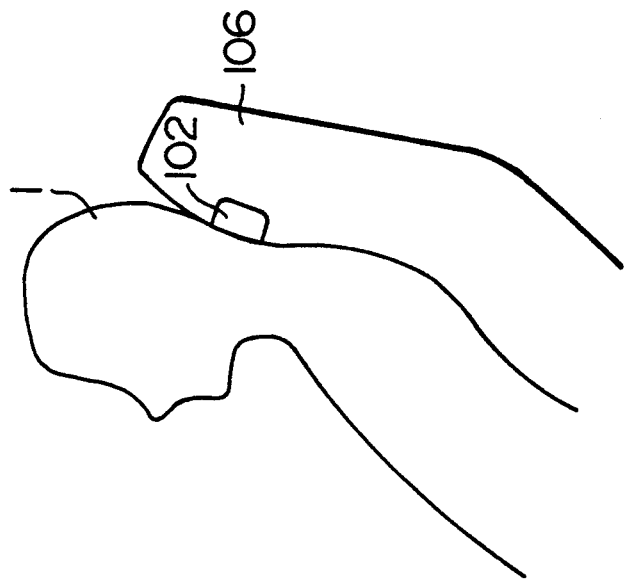
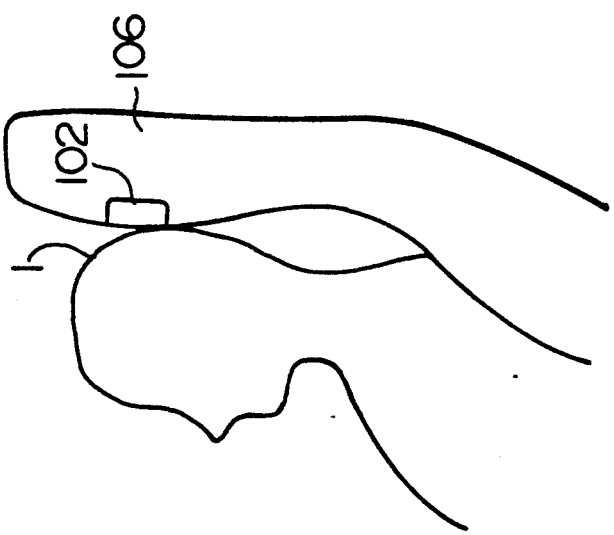

VOICE TRANSDUCER

BACKGROUND OF THE INVENTION

1. Field of the Invention

The present invention relates to a voice transducer used for telecommunication by a telephone installed in a motor vehicle or the like.

2. Description of the Prior Art

There are various kinds of voice transducers, in one kind of which, sound waves of a natural voice transmitted through the air are detected by a sensor such as a microphone so as to convert them into electric signals and process them as voice signals and in another of which, vibrations of a natural voice transmitted through the skull of an operator's head are detected by a sensor such as a piezoelectric element so as to process them as electric signals. The former is suitable when the ambient noise is small, and the latter is suitable when the ambient noise is so large that it is difficult to receive sound waves progressing in the air.

FIG. 1 illustrates the structure of a conventional voice transducer of the latter kind. Reference numeral 1 denotes an operator's head. The voice transducer is designated by reference numeral 102. Reference numerals 103 and 104 respectively designate a casing and a damper material. 105 designates a piezoelectric transducer, i.e., a bimorph cell. When the operator utters voice sounds with the head 1 resting on the voice transducer 102, its voice signal S1 is transmitted through the head 1 in the form of mechanical vibration, and it vibrates the voice transducer 102 in contact with the head 1. The vibration is received by the casing 103 of the voice transducer 102, and the received vibration is delivered through the damper material 104 of liquid state to the bimorph cell 105. The bimorph cell 105 oscillates laterally, as indicated by an arrow A, in response to the delivered vibration, to thereby convert the voice signal in the form of mechanical vibration into an electric signal S2.

FIGS. 3A and 3B illustrate states of application of the voice transducer shown in FIG. 1 when it is used as a telephone for a motor vehicle. The voice transducer 102 is installed in a headrest 106 of a seat in the vehicle, with its surface to be contacted with the head 1 being fixed.

In the case of the conventional voice transducer described above, the portion to be contacted with the head is fixed. Consequently, when the operator's head is brought into contact with the voice transducer, the head may not be sufficiently closely fitted to or contacted with the contact portion of the voice transducer, or even if the head is closely fitted to or contacted with the contact portion of the voice transducer, a contact section of the head may not be a place close to the skull but the neck from which the skull is located far away. There will be therefore a decrease in the magnitude of the vibration of the voice transmitted through the skull of the head so as to be input to the voice transducer. In other words, when a short-bodied operator is seated, as shown in FIG. 3A, the voice transducer 102 is located opposite to an upper portion of the head 1 so that the head 1 and the contact portion of the voice transducer 102 can not be sufficiently closely fitted to each other. On the other hand, when a long-bodied operator is seated, as shown in FIG. 3B, the voice transducer 102 is contacted with the operator's neck so that the vibration of the voice transmitted through the skull of the head 1 can not be detected by the voice transducer 102 without difficulty. As a result, there are encountered problem in that the voltage of the voice signal output from the voice transducer 102 is decreased, and the S/N (sound to noise) ratio is deteriorated.

Moreover, in the case of the voice transducer 102 shown in FIG. 1, when the operator's head 1 is brought into contact with the voice transducer 102, the operator's hair 11 (see FIG. 2) is held between the head 1 and the voice transducer 102, so that unfavorable vibration is inevitably generated by friction between the hair 11 and the surface of the casing 103 when the head 1 is moved. The unnecessary vibration is detected by the voice transducer 102 along with the vibration of the voice transmitted from the head 1, resulting in a problem that the S/N ratio of the electric signal output from the voice transducer 102 is deteriorated drastically.

SUMMARY OF THE INVENTION

One object of the present invention is to provide a voice transducer having an excellent property free from the problems of the output voltage drop and the drastic deterioration of the S/N ratio which are induced by insufficient contact between the voice transducer and an operator's head and contact of the voice transducer with a portion of the head far from the skull.

Another object of the invention is to provide a voice transducer having an excellent property which produces electric signals whose S/N ratio is not drastically deteriorated by unnecessary vibration which is generated by friction between the operator's hair and the voice transducer.

According to one aspect of the present invention, there is provided a voice transducer comprising: voice input means having a side surface to be contacted with an operator's head so as to detect vibrations of produced voice waves when they are transmitted through the skull of the head, convert the vibrations into electric signals, and process them as voice signals; holder means for the voice input means, the holder means being adapted to be fixed in an attachment section where the voice input means are mounted; and connecting means which connect the voice input means to the holder means in such a manner that the position of the side surface of the voice input means with respect to the operator's head can be adjusted.

According to another aspect of the invention, there can be provided a voice transducer comprising: a piezoelectric transducer to detect vibrations of produced voice waves when they are transmitted through the skull of an operator's head; a damper material which surrounds the piezoelectric transducer; and a casing which surrounds the periphery of the damper material and includes a side surface to be contacted with the operator's head so as to receive the vibrations, the side surface of the casing being pre-treated to have a small coefficient of friction.

Other objects, characteristics and advantages of the invention will be more specifically understood from the description of the preferred embodiments with reference to the drawings.

BRIEF DESCRIPTION OF THE DRAWINGS

FIGS. 3A and 3B are schematically explanatory views illustrating, by way of example, states of application of the conventional voice transducer;

DETAILED DESCRIPTION OF THE PREFERRED EMBODIMENTS

Figure 4:
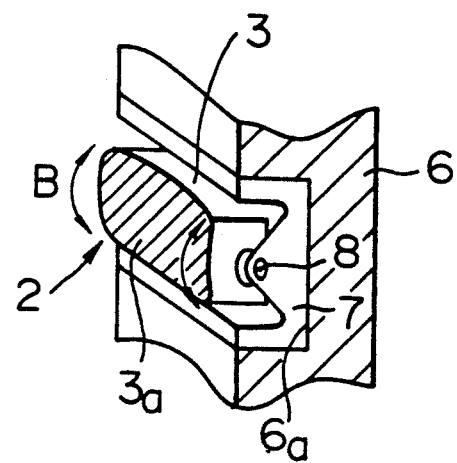
FIG. 4 is a partially broken-away perspective view showing a voice transducer according to one embodiment of the present invention when it is installed in a headrest.
Figure 5:
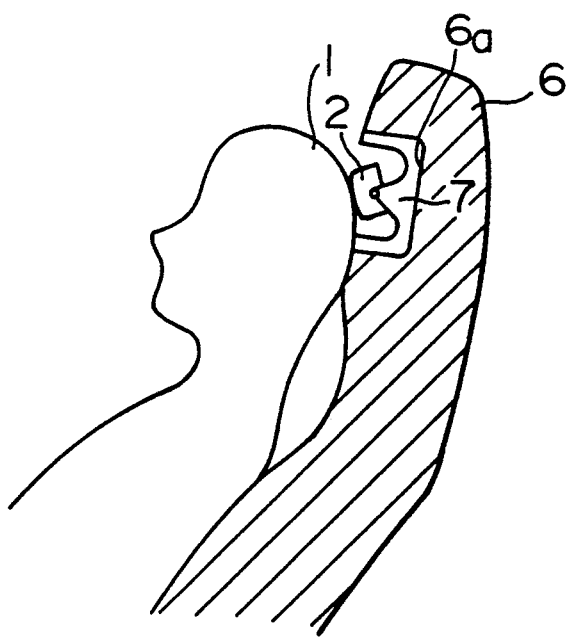
FIG. 5 is a schematically explanatory view illustrating, by way of example, a state of application of the voice transducer shown in FIG. 4.

FIGS. 4 and 5 illustrate a voice transducer according to one embodiment of the present invention. As shown in FIG. 4, the voice transducer comprises a main body 2, a holder member 7 and a rod 8 which is a member for connecting the main body 2 to the holder member 7. The main body 2 is attached to the holder member 7 by means of the rod 8 in such a manner that it can be swung upwardly or downwardly, as indicated by an arrow B, and then held at a desired swung location. It should be noted that since a known structure can be chosen for the attachment of the main body 2 to the holder member 7 in a manner to be able to be swung and held in a desired posture, the detailed illustration of the structure of the attachment is omitted from the drawing. The holder member 7 is securely fitted in a recess 6a which is a mounting portion formed in a headrest 6 of a seat.

Figure 1:
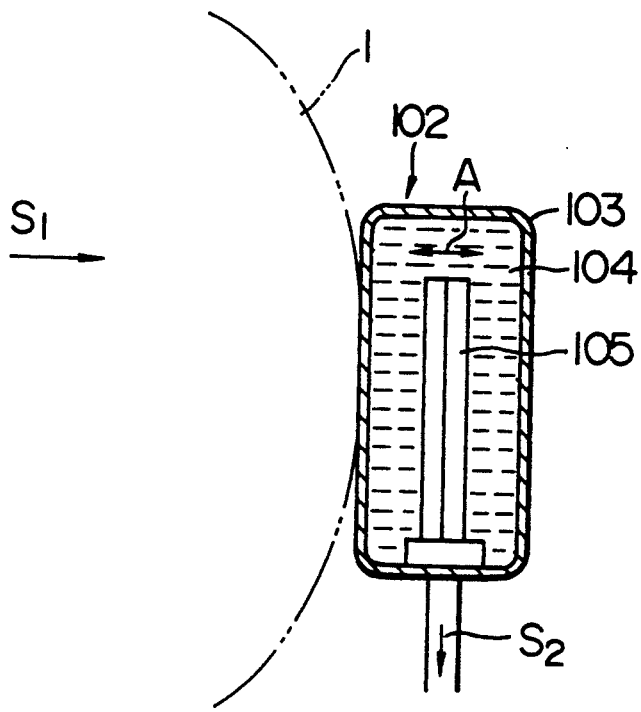
FIG. 1 is a schematic cross-sectional view of a conventional voice transducer.
Figure 2:
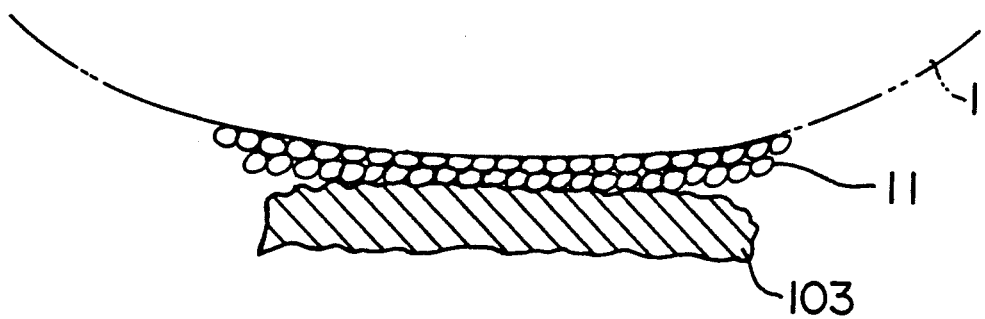
FIG. 2 is an enlarged view partially showing the conventional voice transducer of FIG. 1.

The main body 2 whose structure is similar to that of the conventional voice transducer 102 shown in FIG. 1 comprises a casing 3 with a side surface 3a to be contacted with an operator's head 1, a bimorph cell which is a piezoelectric transducer provided inside of the casing 3 (see the conventional bimorph cell denoted by reference numeral 105 in FIG. 1), and a damper material which surrounds the bimorph cell at the inside of the casing 3 (see the conventional damper material denoted by reference numeral 104 in FIG. 1). The side surface 3a of the casing 3 is curved outwardly defining a smooth surface to be contacted with the head 1 in a preferable condition.

The side surface 3a is pre-treated for reducing the friction coefficient and arranged to be less uneven and have no minute projections of acute angles which may catch the hair of the operator. This treatment is given to the side surface 3a in such a manner and for such a reason as to be described later in relation to another embodiment illustrated in FIG. 6.

Now, referring to FIG. 5, when a short-bodied operator is seated, the main body 2 is swung downwardly and held or fixed in the position thus swing, so as to cause the side surface 3a to be closely fitted to or contacted with the head 1 adequately. As a result, voice sounds transmitted through the skull of the head 1 can be received by the main body 2 of the voice transducer without fail.

On the other hand, when a long-bodied operator is seated, the main body 2 is swung upwardly and held in the position thus swung, and the operator makes a simple adjustment such as reseating himself to slightly lower the position of the head 1, so that the portion of the voice transducer to be contacted with the head 1, i.e., the side surface 3a, is closely fitted to or contacted with the head 1 satisfactorily. In this manner, according to this embodiment, the head of the operator and the surface of the voice transducer to be contacted with the head can be always closely fitted to each other to such an extent as to effectively prevent a voltage drop in the output of the voice transducer and degradation of the S/N ratio.

In the above description, the voice transducer is installed in the headrest portion of the automobile seat. However, such a voice transducer can be similarly applied to various other kinds of seats so far as it is the voice transducer which detects vibration of natural voice sounds transmitted through the skull of the operator's head and converts them into electric signals.

The above-described embodiment is advantageous in that it can be sufficiently closely fitted to the portion of the operator's head whch is close to the skull because the portion of the voice transducer in contact with the head can be moved up or down. Thus, it produces an effect that the vibrations of the voice sounds transmitted through the skull of the head are not decresed in magnitude, so as to solve such problems as a voltage drop in the output of the voice transducer and degradation of the S/N ratio.

Figure 6:
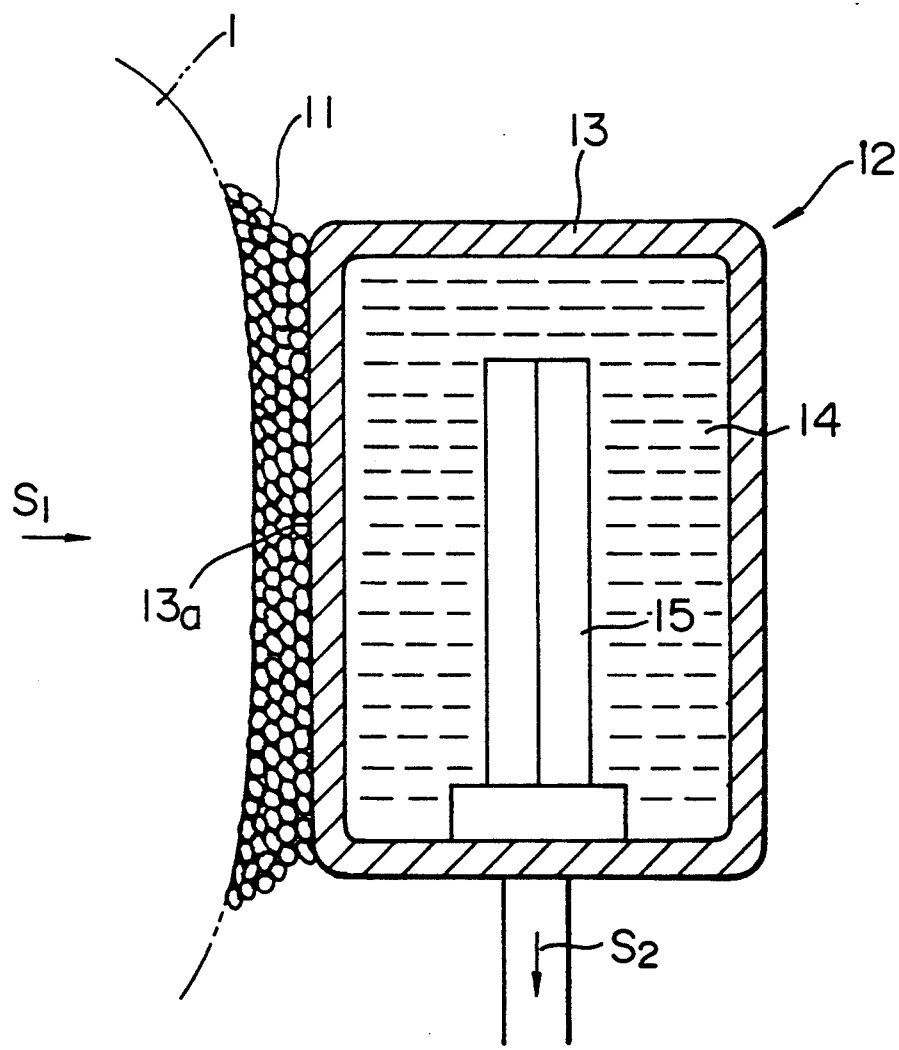
FIG. 6 is an explanatory view illustrating the relationship between a voice transducer according to another embodiment of the invention and an operator's head.

FIG. 6 illustrates a voice transducer 12 according to another embodiment of the present invention. The voice transducer 12 whose structure is similar to that of the conventional one shown in FIG. 1 comprises a casing 13, a piezoelectric transducer, i.e., a bimorph cell 15, and a damper material 14 of liquid state, for the purpose of converting a voice signal S1 into an electric signal S2.

In the embodiment shown in FIG. 6, the casing 13 has a side surface 13a to be contacted with the operator's head 1, and the side surface 13a is pre-treated to make the friction coefficient smaller than that of a material of the casing 13. The method of this treatment is, for example, polishing. The casing 13 may be formed of a metal plate, a plastic plate or the like. Alternatively, the casing 13 may be a die cast product, a plastic molded product or the like. The above treatment may be performed by mechanically polishing the side surface 13a alone or by immersing the whole casing 13 in a chemical liquid to reduce the friction coefficient of the entire outer surface of the casing 13.

According to this embodiment, the side surface 13a of the casing 13 is made to have a small friction coefficient to thereby decrease the magnitude of unnecessary vibration generated due to friction between the operator's hair 11 and the casing 13 when the head 1 is moved while the head 1 is in contact with the voice transducer 12. Therefore, the vibrations S1 caused by the voice waves are transmitted, at a favorable S/N ratio, through the casing 13 and the damper material 14 toward the bimorph cell 15 serving as a piezoelectric transducer, and consequently, the electric signal S2 which is a voice signal at a favorable S/N ratio is output to an electric signal receiver unit (not shown).

Thus, the above-described embodiment produces an effect that unfavorable vibrations are lessened owing to a small friction coefficient of the side surface 13a of the casing 13 in order to improve the S/N ratio of the electric signal S2 which is output from the voice transducer 12 in response to the vibrations S1 of the voice waves generated from the operator's vocal cord.

It should be noted that the side surface 13a of the casing 13 requires treatment to form a mirror-like surface smoother than an ordinarily machined surface so that the side surface 13a becomes less uneven, and especially, has no minute projections of acute angles which may catch the operator's hair.

What is claimed is:

1. A voice transducer system comprising:
   a vehicle including a seat having a headrest;
   a voice input means having a side surface to be contacted with an operator's head so as to detect vibrations of produced voice waves when they are transmitted through the skull of the head, convert them into electric signals, and process them as voice signals;
   holder means for holding said voice input means, said holder means being fixed in an attachment section where said voice input means are mounted, said attachment section being provided in a recess formed in said headrest; and
   connecting means for connecting said voice input means to said holder means to enable the voice input means to pivot upwardly and downwardly with respect to said headrest and said seat.

2. A voice transducer system according to claim 1, wherein said voice input means includes a casing providing said side surface to be contacted with the operator's head, a bimorph cell fixed inside said casing, and a damper material which surrounds said bimorph cell at the inside of said casing.

3. A voice transducer system according to claim 2, wherein said side surface of the voice input means is pre-treated to have a small coefficient of friction.

4. A voice transducer system according to claim 1, wherein said one portion of the seat is a headrest.

5. A voice transducer system according to claim 4, wherein said attachment section is a recess formed in the headrest.

6. A voice transducer system according to claim 1, wherein said side surface of the voice input means is curved outwardly defining a smooth surface whereby it can be contacted with the operator's head without producing rubbing noises.

7. A voice transducer system comprising;
   a vehicle including a seat;
   a casing mounted on said seat;
   a piezoelectric transducer disposed in said casing to detect vibrations of produced voice waves when they are transmitted through the skull of an operator's head; and
   a damper material which is disposed in said casing and surrounds said piezoelectric transducer, said casing including a side surface to be contacted with the operator's head so as to receive said vibrations, said side surface of the casing being pretreated to have a small coefficient of friction to reduce rubbing noises when the operator's head slides on said side surface.

8. A voice transducer system according to claim 7, wherein said casing is formed of a metal, said side surface of the casing being polished.

9. A voice transducer system according to claim 7, wherein said casing is formed of a plastic material, said side surface of the casing being polished.

10. A voice transducer system according to claim 7, wherein said side surface of the casing is polished so as not to have minute projections of acute angles.

11. A voice transducer system according to claim 8, wherein said polished side surface is a mirror-like surface.

12. A voice transducer system according to claim 9, wherein said polished side surface is a mirror-like surface.

* * * * *